United States Patent [19]
Zieba et al.

[11] Patent Number: 5,995,271
[45] Date of Patent: Nov. 30, 1999

[54] PROTECTIVE COATING MATERIALS FOR ELECTROCHROMIC DEVICES

[75] Inventors: Jerry Zieba; Curtis Ross Hruska; Steven P. Sapers; Michael J. Cumbo; Nada A. O'Brien, all of Santa Rosa, Calif.

[73] Assignee: Optical Coating Laboratory, Inc., Santa Rosa, Calif.

[21] Appl. No.: 08/946,604

[22] Filed: Oct. 7, 1997

[51] Int. Cl.[6] ................................. G02F 1/15
[52] U.S. Cl. .................. 359/265; 156/99; 359/267; 359/274; 359/275; 427/165; 427/168; 427/169; 427/240; 427/389.7; 428/411.1; 428/412; 428/473.5
[58] Field of Search ............... 156/99; 359/265, 359/267, 274, 275; 427/167, 168, 169, 240, 389.7, 428; 428/411.1, 412, 473.5

[56] References Cited

U.S. PATENT DOCUMENTS

| | | | |
|---|---|---|---|
| 4,227,779 | 10/1980 | Bissar et al. | 350/357 |
| 4,392,720 | 7/1983 | Ganguillet et al. | 350/357 |
| 4,403,831 | 9/1983 | Amano | 350/334 |
| 4,465,339 | 8/1984 | Baucke et al. | 350/357 |
| 4,852,979 | 8/1989 | Agrawal | 350/357 |
| 5,173,561 | 12/1992 | Gupta | 528/183 |
| 5,216,536 | 6/1993 | Agrawal et al. | 359/274 |
| 5,387,629 | 2/1995 | McGrath et al. | 524/190 |
| 5,721,633 | 2/1998 | Nagai et al. | 359/274 |

FOREIGN PATENT DOCUMENTS 58-91431   5/1983   Japan.

*Primary Examiner*—D. S. Nakarani
*Attorney, Agent, or Firm*—Workman, Nydegger & Seeley

[57] ABSTRACT

The present invention is directed to a polymeric coating material used to protect electrochromic devices from environmental and mechanical damage. The protective polymeric coating material in the present invention are physically, chemically and optically compatible with the electrochromic cell layers. The polymeric coating materials in the present invention are polymers having generic polymer back-bones selected from the group consisting of polyimides, polybenzimidazoles, polybenzothiazoles, polybenzoxazoles, poly(phenylene ethers), polyquinolines, polycarbonates and polysulfones.

15 Claims, 7 Drawing Sheets

PROTECTIVE COATING MATERIALS FOR ELECTROCHROMIC DEVICES

BACKGROUND OF THE INVENTION

1. The Field of the Invention

The present invention is directed to polymeric materials used to form protective coatings on electrochromic devices. The present invention is also directed to a process for preparing electrochromic devices having a protective polymeric coating thereon.

2. The Relevant Technology

Electrochromic devices are optical devices typically composed of thin layers of inorganic oxides that change color in response to an applied voltage. Electrochromic devices have many useful applications, such as intentionally darkening windows, mirrors, eyeglasses, filters and electro-optical devices. A problem with electrochromic devices, however, is that electrochromic devices lack the long term durability to be practically useful.

Electrochromic devices lack the structural and chemical durability to have any viable commercial application. Even the slightest physical contact can damage an electrochromic structure and render the electrochromic device unusable. Furthermore, any scratch or other blemish on the surface of the electrochromic device can adversely effect the optical qualities of the device. In short, electrochromic devices are exposed to physical contact that destroys, or significantly shortens the lifetime of electrochromic devices.

Similarly, electrochromic devices have a delicate chemical make up that is easily altered by exposure to reactive substances, such as moisture, oxygen, cleaning solutions and other contaminants. Any variation in the chemical nature of the electrochromic layers, whether from the evolution of necessary elements from the device, or the invasion of reactive elements into the device, adversely effects, or destroys, the proper functioning of the electrochromic device. Hence, for the electrochromic device to be economically viable, it is vital that any physical or chemical contact with the electrochromic device be greatly reduced or completely avoided.

In an attempt to make electrochromic devices commercially viable, many people have tried to increase the mechanical and environmental durability of electrochromic devices by coating the electrochromic devices with polymers, reaction curing-type resins, adhesive resins and other various materials. While many of these coating materials have been effective barriers to environmental or mechanical elements, none of the proposed coatings have provided complete protection from both environmental and mechanical damage. For instance, many polymeric materials form effective environmental or chemical barriers, but are much less effective in protecting electrochromic devices against mechanical impact, such as scratching, handling, or other contact (Japanese Application No. 58-91431(A); Baucke et al., U.S. Pat. No. 4,465,339; Ganglier et al., U.S. Pat. No. 4,392,720; Bissar et al., U.S. Pat. No. 4,227,779; and Amano, U.S. Pat. No. 4,403,831). Similarly, coating materials that form effective mechanical barriers are commonly porous and, thus, do not provide adequate environmental or chemical protection for electrochromic devices.

To provide an environmental and mechanical barrier for electrochromic cells, Agrawal U.S. Pat. No. 4,852,979, discloses the use of two layers of protective materials, one layer immediately adjacent to the electrochromic cell that protects the cell from mechanical damage and an outer layer covering the entire area of the electrochromic cell, including the mechanical barrier, that protects the cell from reactive elements, such as moisture and oxygen. The combination of these two layers provides a coating that effectively protects the electrochromic device from mechanical and electrical damage.

Unfortunately, the use of two layers is time consuming and expensive. Furthermore, as mentioned above, electrochromic devices are optical devices and any coating added to the electrochromic device must not adversely effect the optical characteristics of the device. Therefore, the coatings must have a specific refractive index, optical emissivity, thermal expansion coefficient, etc. The greater the number of layers added to the electrochromic device, the greater the possibility that the optical qualities will be affected. A further drawback of the process in Agrawal is that the materials used to form the protective layers cannot be exposed to temperatures greater than 65° C. during processing. This severely limits the curing process and coating materials that may be used in coating formation.

From the foregoing, it is readily apparent that there is a need for a coating material that can be used to protect electrochromic devices from environmental as well as mechanical damage while maintaining the optical qualities of the electrochromic device. Furthermore, it is clear that there is a need for an efficient process for coating electrochromic devices.

SUMMARY AND OBJECTS OF THE INVENTION

It is, therefore, an object of the present invention to provide a protective coating material that protects sensitive devices from both environmental and mechanical damage.

It is another object of the present invention to provide a protective coating material that is physically and chemically compatible with electrochromic devices.

It is also an object of the present invention to provide a protective coating material that is compatible with the optical characteristics of electrochromic devices.

It is a further object of the present invention to provide simple process for applying a protective coating on an electrochromic device.

To achieve the foregoing objects, and in accordance with the invention as embodied and broadly described herein, the present invention is directed to a polymeric coating material that effectively protects delicate devices from environmental and mechanical damage. The polymeric coating material in the present invention is physically, chemically and optically compatible with the electrochromic cell layers.

In a preferred embodiment of the present invention, an electrochromic device comprises an electrochromic cell and a coating on the electrochromic cell, wherein the coating comprises a polymer having the general formula selected from the group consisting of:

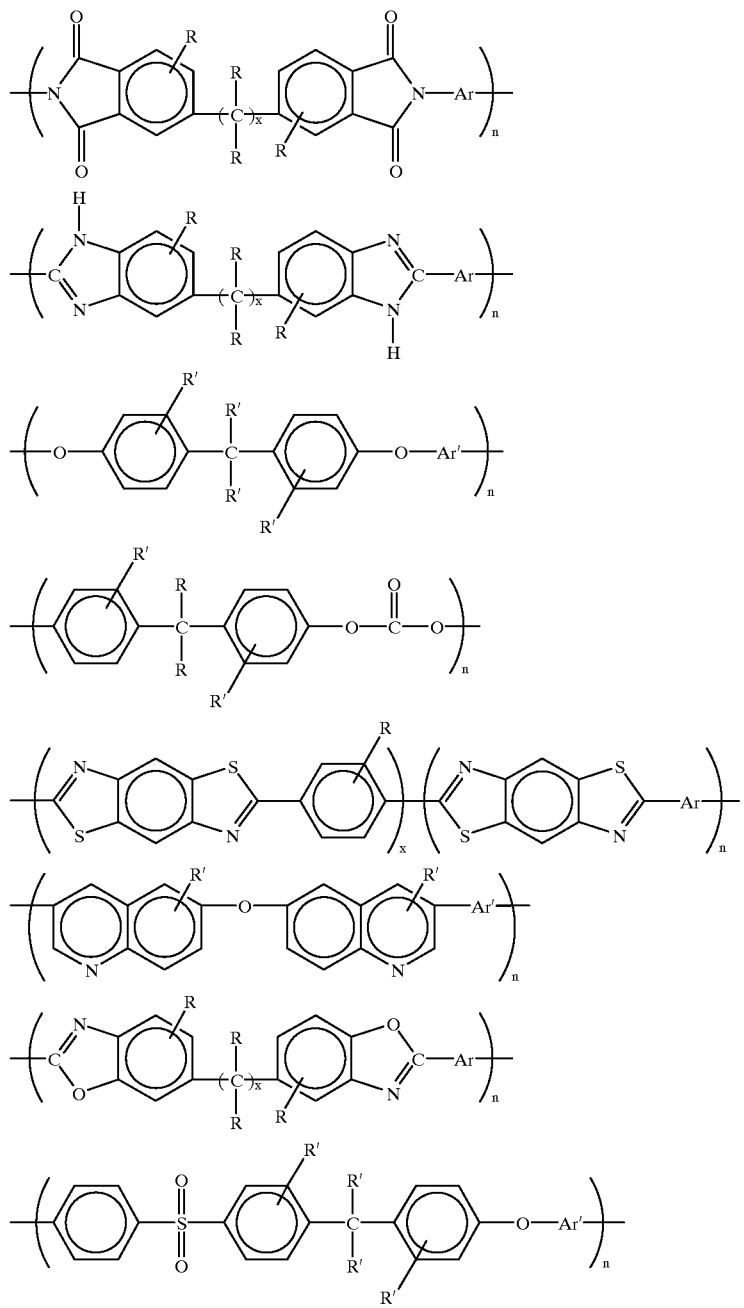
wherein Ar is selected from the group consisting of:
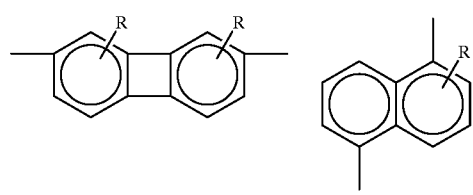
-continued
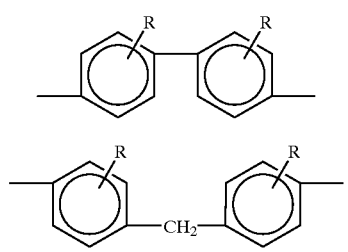

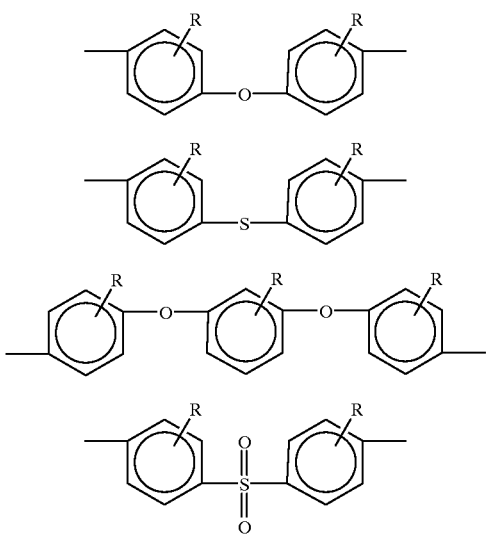

wherein Ar¹ is selected from the group consisting of:

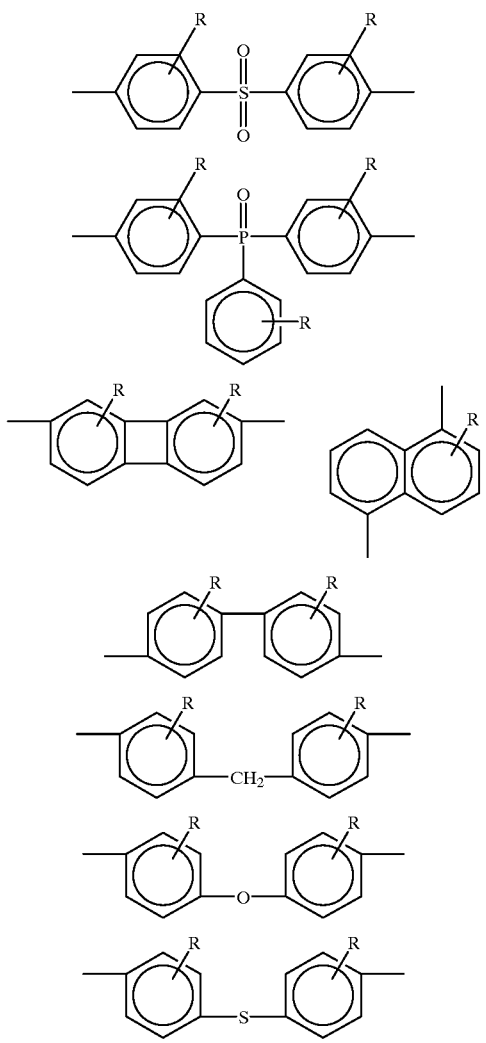

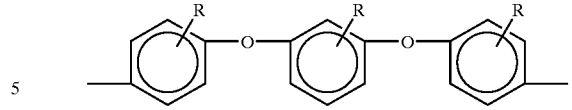

wherein n is between 1 and 10;

wherein X is 0 or 1;

wherein R is selected from the group consisting of H, $CF_3$, $C_nH_{2n+1}$, $OC_nH_{2n+1}$ and mixtures thereof; and wherein $R^1$ is selected from the group consisting of H, $CF_3$, $C_nH_{2n+1}$, $OC_nH_{2n+1}$, -phenyl, fluorenyl, naphtalenyl and mixtures thereof.

In a more preferred embodiment of the present invention, the coating material is a polymer selected from the group consisting of a polymer having the recurring structural unit [Poly[2,5-benzoxazolediyl[2,2,2-trifluoro-1-(trifluoromethyl)ethylidene]-5,2-benzoxazolediyl-4,4'-phenylether]]n'; [α-[1,4-Biphenylyl]-ω-[4-[[4-(4-phenylphenoxy)phenyl]phenylphosphinyl]phenoxy]-poly[oxy-1,4-phenylene(phenylphosphinylidene)-1,4-phenyleneoxy-1,4-phenylene-9H-fluoren-9-ylidene-1,4-phenylene]]n'; and [α-[1,4-Biphenylyl]-ω-[4-[[4-(4-phenylphenoxy)phenyl]phenylphosphinyl]phenoxy]-poly[oxy-1,4-phenylene(phenylphosphinylidene)-1,4-phenyleneoxy-1,4-phenylene [2,2,2-trifluoro-1-(trifluoromethyl)ethylidene]-1,4-phenylene]]n'; wherein n' is an integer.

The present invention also provides methods of manufacturing an electrochromic device comprising an electrochromic cell having a protective coating thereon. In a preferred embodiment the method comprises forming an electrochromic cell on a supportive substrate, such as glass or other plastic or polymeric structure; coating the electrochromic cell with a polymeric solution which when dried will be chemically inert, have high optical qualities and be thermally stable; and annealing the coating by heating the electrochromic device to a temperature above 65° C.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
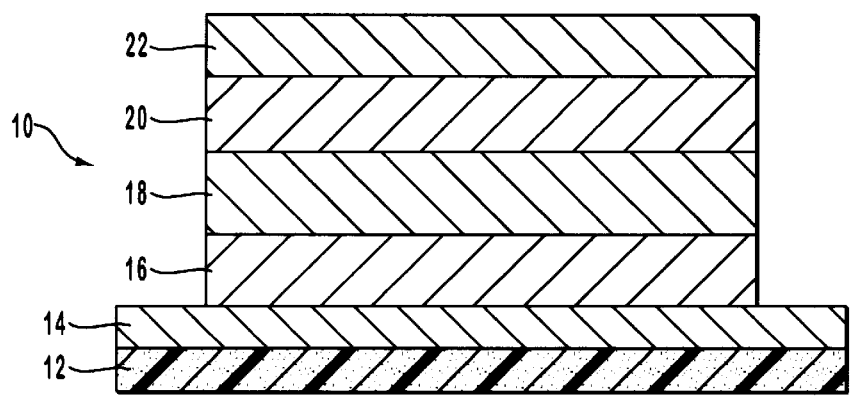
FIG. 1 illustrates a cross-sectional view of a prior art electrochromic device.

The present invention is directed to polymeric materials used to form protective coatings on electrochromic devices. The present invention is also directed to a process for preparing electrochromic devices having a protective polymeric coating thereon. As used herein electrochromic devices include, but are not limited to, transparent electrochromic devices and electrochromic mirrors.

Electrochromic devices have many useful applications, such as architectural windows, sunglasses, mirrors and electro-optic displays. However, electrochromic devices lack the long-term durability to have any commercially viable application.

To increase their durability, electrochromic devices are typically coated with protective coatings that insulate the electrochromic cell from its external environment. Although many different coating materials, including organic and inorganic materials have been used as protective coatings for electrochromic cells, none of these coatings protect electrochromic devices from both environmental and mechanical damage.

In an attempt to provide adequate protection from external elements, multiple layers of differing materials have been applied to electrochromic devices. In addition to being both time consuming and expensive, it is difficult to maintain the optical quality of electrochromic devices when multiple layers of differing materials are applied to the surface of the electrochromic device. This problem is compounded by other specific requirements necessary for electrochromic devices. For instance, the refractive index of the layers must match the refractive index of the electrochromic device, the thermal expansion coefficients of all the materials should be close to the thermal expansion coefficient of the electrochromic structure to avoid any mechanical stress being applied to the delicate electrochromic device, the materials must be chemically inert so that the materials do not react with the inorganic oxide layers of the electrochromic device, as well as many other necessary requirements. The more materials and the more layers that are added to the electrochromic device, the greater the chance that the materials will adversely affect the electrochromic device. Unfortunately, a single coating material that protects the electrochromic cell from its surroundings, both mechanically and environmentally, as well as having all the other properties necessary for the proper functioning of electrochromic devices is not known.

It is a feature of the present invention to provide a material for coating electrochromic devices, that protects electrochromic devices from their surroundings. In addition to its protective function, coating materials preferably have a number of other qualities important to the proper functioning of electrochromic devices.

In a preferred embodiment, in addition to coating materials protecting electrochromic devices from environmental and mechanical damage, coating materials should also possess a unique combination of properties to preserve the delicate physical and chemical make up of electrochromic devices. These properties include:

(a) being chemically inert, so that the coating does not adversely affect the layers of the electrochromic cell or react upon prolonged exposure to ultraviolet light;

(b) having high optical quality such that light does not scatter as it passes through the coating layer and so that the refractive index of the coating can be matched to the refractive index of the electrochromic cell;

(c) being thermally stable, such that the coating is stable over a broad range of temperatures (at least −50° C. to 150° C.) and that the thermal expansion coefficient of the coating will not result in any undue mechanical strain as the coating cures;

(d) having a low emissivity, i.e., having a very low absorption in the infrared region, so that when the electrochromic device is used as a window, the protective layer will not absorb heat;

(e) being soluble in organic solvents that are suitable for coating electrochromic devices;

(f) having a strong adhesion to the electrochromic device;

(g) having a low gas permeability; and (h) having a high transmission in the visible region.

In accordance with the present invention, it has been discovered that polymeric materials having the following generic polymeric back-bones structures are particularly useful as electrochromic devices:

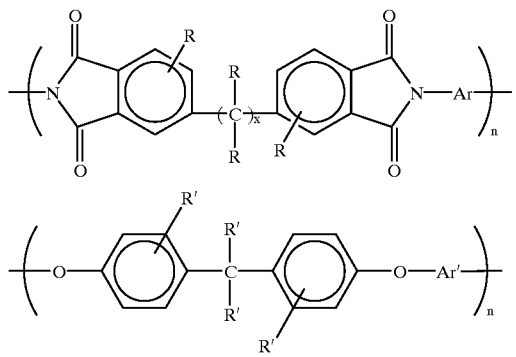

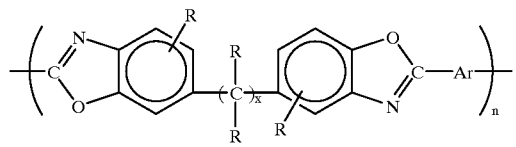
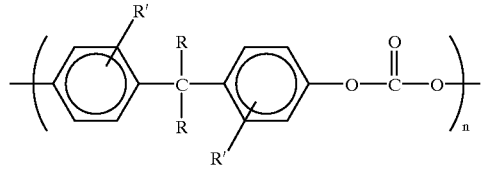
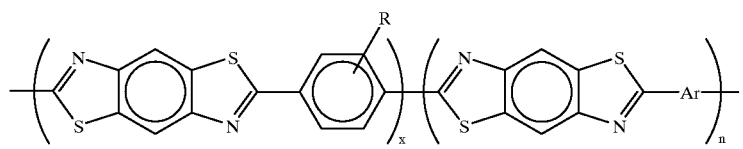
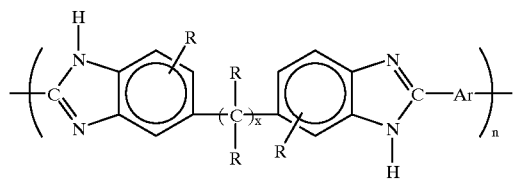
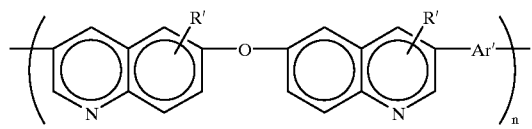
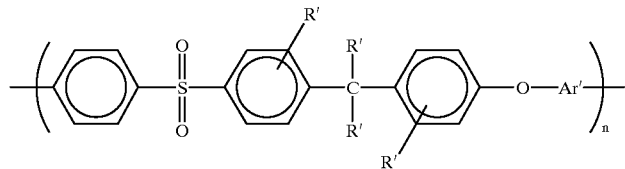
wherein Ar is selected from the group consisting of:
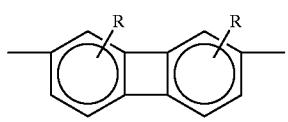
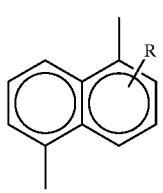
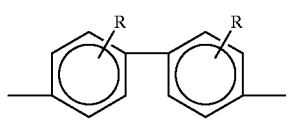
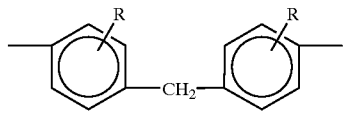
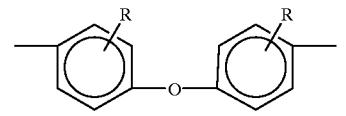
-continued
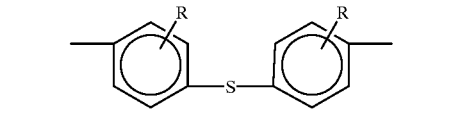
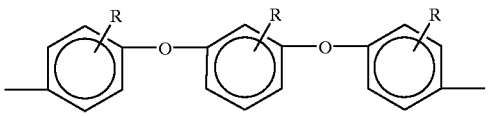
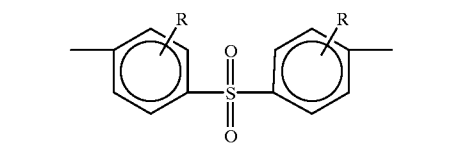
wherein Ar¹ is selected from the group consisting of:
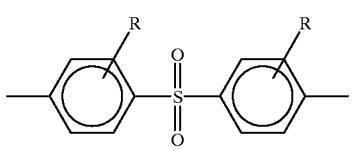

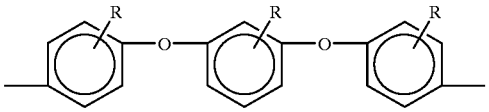

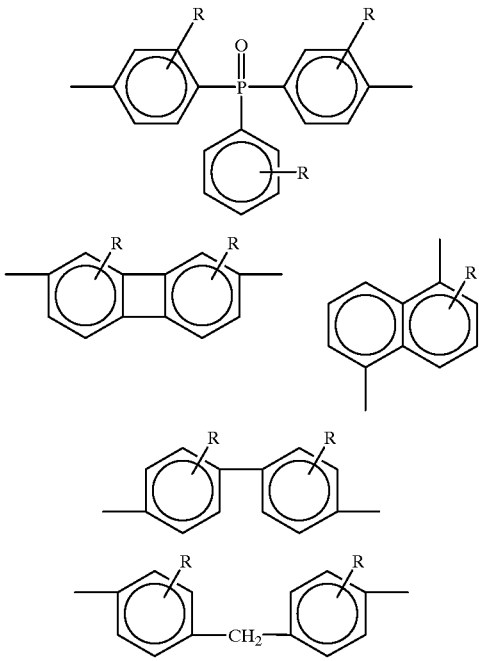

-continued

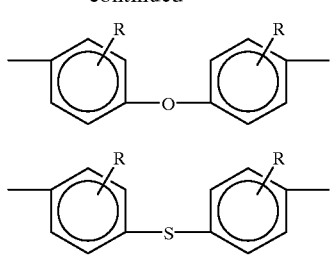

wherein n is between 1 and 10;

wherein X is 0 or 1;

wherein R is selected from the group consisting of H, $CF_3$, $C_nH_{2n+1}$, $OC_nH_{2n+1}$ and mixtures thereof; and wherein $R^1$ is selected from the group consisting of H, $CF_3$, $C_nH_{2n+1}$, $OC_nH_{2n+1}$, -phenyl, fluorenyl, naphtalenyl and mixtures thereof.

By modifying these generic polymeric chains with differing combinations of the appropriate functional groups listed above, a large number of effective polymeric materials can be formed having the above-mentioned desirable qualities.

More specifically, in a preferred embodiment of the present invention, specific polymeric coating materials that have proven to be particularly useful in coating electrochromic devices include polymers having the following recurring structural units:

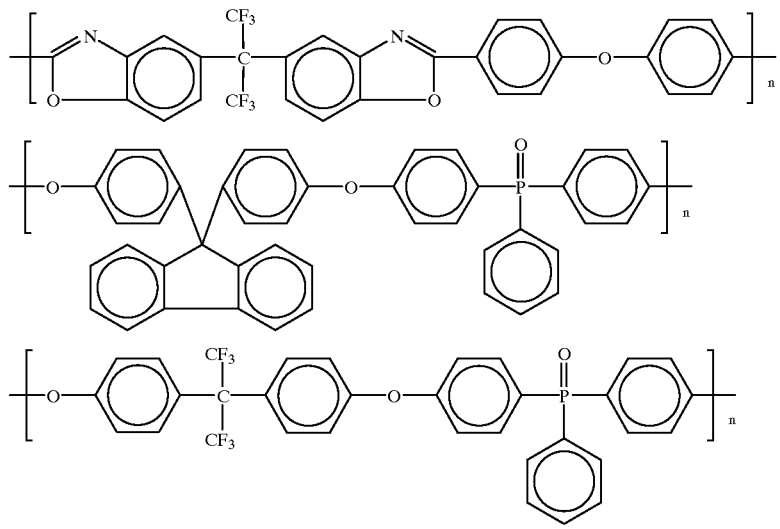

Figure 2:
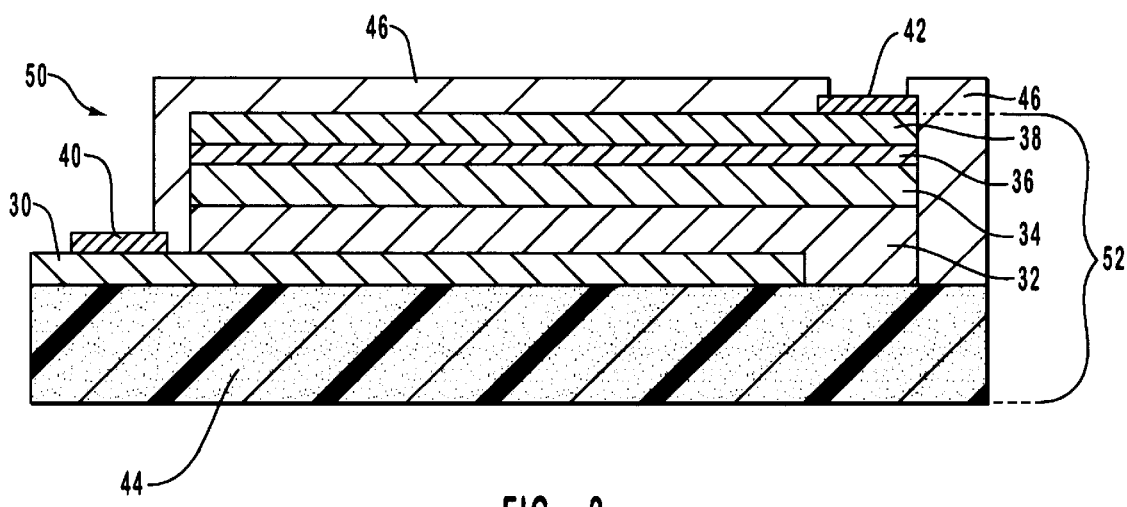
FIG. 2 illustrates a cross-sectional view of an electrochromic device comprising an electrochromic cell on a supportive substrate, wherein the electrochromic device comprises a protective coating on the electrochromic cell.

Referring now to FIG. 2 of the drawings which illustrates a cross-section of a preferred solid state electrochromic device 50 that is completely protected from the external environment by a protective coating 46. The electrochromic cell 52 is a proton based solid state electrochromic structure comprising a first electrical conducting layer 30, such as indium tin oxide, having either an electrochromic layer or a counter electrode layer 32 formed thereon. Layer 34 formed on layer 32 is an ion conducting layer which allows the ions to migrate between the electrochromic layer and the counter electrode layer. Layer 36 located on the ion conducting layer is either a counter electrode layer or an electrochromic layer depending on layer 32. For example, if layer 32 is an electrochromic layer, layer 36 is either a counter electrode layer or an electrochromic layer. If layer 32 is a counter electrode layer, however, layer 36 is an electrochromic layer.

A second electrical conducting layer 38 is formed on layer 36. The electrochromic cell is formed using any known technique for depositing layers 30, 32, 34, 36 and 38, including, but not limited to vacuum deposition, sputtering, evaporation, solution dipping, spinning, spraying and the like.

A voltage is applied to the electrochromic device by a voltage means which includes any type of electrical connection. Bus bars 40 and 42 are examples of voltage means that provide a voltage through the layers of electrochromic device 50. In the preferred embodiment, illustrated in FIG. 2, first bus bar 40 is positioned such that it contacts first electrical conducting layer 30 and second bus bar 42 is positioned such that it contacts second electrical conducting layer 38. The electrochromic cell 52 is typically formed on a supportive substrate structure 44, such as glass. Protective coating 46 is formed on the electrochromic cell so that the protective coating encompasses at least layers 32, 34, and 36. As illustrated in FIG. 2, bus bar 40 and 42 are exposed to the external environment so that an electrical connection can be made to the electrochromic cell 52.

Protective coating 46 provides excellent optical quality for electrochromic device 50 while functioning as an efficient barrier to water, oxygen, chemicals, high temperatures and other environmental elements and contaminants. In addition to preventing environmental contaminants from contacting the electrochromic cell layers, the protective coating also traps and contains necessary materials within the electrochromic cell, such as an optimum amount of moisture. By acting as a barrier to the external environment and by trapping the necessary materials within the cell, the protective coating prevents premature deterioration of the electrochromic device by preserving the charge capacity at the counter electrode layer of the electrochromic cell. Coating layer 46 also allows electrochromic device 50 to be cleaned using common organic solvents or water-based detergents and also acts as an efficient barrier to mechanical damage, absorbing the impact from transporting, handling, or other external contact.

Polymers within the scope of the present invention are preferably applied to the electrochromic cell in a solution of the polymer in a suitable organic solvent. The polymeric material can be present in the solution in any amount that will form a coating on the electrochromic device, but is preferably present in amount between about 0.2% to about 10% by weight of the polymer in a suitable organic solvent, and most preferably between about 0.5% to about 10% by weight.

Any suitable organic solvent can be used to dissolve the solution in the coating process. The solvent should not, however, have a boiling point so low as to cause deterioration in the optical quality and mechanical resilience of electrochromic devices provided with the protective layer. Additionally, it is important that the solvents not have a boiling point so high that it is difficult to remove after the protective coating has been applied. Extended periods of exposure to very high drying temperatures when high boiling point solvents are used may damage the electrochromic devices. Furthermore, solvents having reactive, highly polar functional groups should be avoided during the coating process because these functional groups tend to interact with the functional groups present on the polymeric structures and are, thus, difficult to remove. If these polar solvents are not entirely removed from the protective coating layer, the reactive, polar functional groups tend to react with and destroy the inorganic oxide layers of the electrochromic cell. Moreover, it is important that none of the organic solvent remains trapped under the protective coating layer because any remaining organic solvent will taint the electrochromic device and the polymer coating.

In a preferred embodiment, the organic solvents used to form the polymeric solutions include, but are not limited to, toluene, xylenes, chlorobenzene, ortho-dichlorobenzene, cyclopentanone, cyclohaxanone, and mixtures thereof. Alkyl and alkoxy groups can be added to the polymeric back-bone structure to make the polymeric coating materials more soluble in the organic solvents.

After the polymer is dissolved in an appropriate amount of the organic solvent, the polymer solution is preferably filtered to remove any microparticles or other impurities that may affect the deposition process. The polymeric solution should then be out-gassed under low pressures to remove any micro-bubbles and dissolved gasses.

The electrochromic cell is mounted into the coating equipment, the coating parameters are set for properties such as the polymeric coat thickness, and the polymeric coating material is deposited on the electrochromic cell. The protective coating can be applied to the surface of the electrochromic cell using any suitable deposition technique known in the art, including, but not limited to, spin coating, dipping, spraying, roll-coating and extrusion, so that the protective coating is applied in an uniform manner, free of pin holes or any other defects. Defects such as non-uniformities and pin holes at the interface of the protective coating and the electrochromic cell result in optical interference effects of the electrochromic device. When the polymeric coating material has dried on the electrochromic cell the coating will be chemically inert, have high optical qualities and be thermally stable.

In a preferred embodiment, the coating step is performed in an environment having a reduced level of humidity and a reduced level of oxygen, so that no moisture, oxygen or other chemical is captured under the protective coating layer. An inert atmosphere may be used to reduce the moisture and oxygen content during the deposition process. Depending on the polymer used to form the protective coating, it may be necessary to process the polymeric coating layers under extremely dry conditions to form protective coating layers having the desired qualities.

Once applied to the electrochromic cell, the polymeric coating materials are exposed to a high temperature annealing processes. The annealing process is preferably performed by heating the electrochromic device to a temperature above about 65° C., and most preferably in a range between about 75° C. and about 250° C. Elevated temperatures during the annealing process accelerate the drying process of the freshly coated protective material and allow the polymeric coating material to reach its most stable structure and configuration both chemically and physically in a short period of time. The particular temperature used in the annealing process is dependent on the chemical structure of the polymeric material being used. It is, however, important to avoid exposure of the coated electrochromic device to thermal shock during the annealing process.

It is preferable to keep the relative humidity during the annealing process as low as possible. A relative humidity above 45% during the annealing process may detrimentally affect the performance of the protective coating layer. Once deposited, dried and annealed, the ambient humidity does not affect the protective coating layer.

After the annealing process, the polymeric coated electrochromic device is ready for further manufacturing steps, such as manufacturing windows, mirrors, sunglasses and other devices. The annealed protective polymeric coating is characterized by its transparent, high optical qualities. The polymeric coating maintains its protective and optical qualities at least in a temperature range from about −50° C. to about 150° C., does not chemically effect the electrochromic cell layers and has a low emissivity. The protective coating minimizes the amount of water and oxygen that is capable of passing through to the electrochromic cell layers, and encapsulates the moisture originally present in, and necessary for, the proper functioning of the electrochromic device.

The thickness of the protective layer does not effect the performance of the protective layer; the protective coating can be of any thickness. However, depending on the particular design of an electrochromic device and its future application, differentiation of the thickness may provide additional mechanical protection, environmental protection or both mechanical and environmental protection. For example, in certain electrochromic device designs and applications, the thickness of the protective layer can be up to about 100 microns and in a preferred embodiment, the protective coating comprises sufficient mechanical and environmental durability at a thickness in the range between about 0.1 to about 20 micrometers.

It should be noted that the protective coatings disclosed herein can also be used to protect other types of devices and coatings and are especially useful to those devices that are sensitive to mechanical and environmental exposure. The polymeric coating materials can further be used with any device where sealing, protection, and encapsulation of devices, structures and coatings is needed to prevent thermally and environmentally induced degradation. The coatings are applied to other devices in the same manner as applied to electrochromic devices.

PACKAGING ELECTROCHROMIC DEVICES

As mentioned above, because of their sensitive chemical and mechanical nature, electrochromic devices must be protected from the environment. For example, even small amounts of water, the touch of a finger, cleaning solvents or excess movement can destroy the electrochromic device. Even though the polymeric protective coatings in the present invention provide excellent protection from mechanical stress and chemical elements, for the electrochromic device to be capable of withstanding uses in everyday applications, such as architectural windows and eyeglasses, it is necessary to further package the sealed electrochromic device between rigid, protective substrates (i.e., glass, plastic, or the like).

Solid state electrochromic devices are typically deposited on a first rigid substrate. The problem is that, until the present invention, no adequate means of adding another rigid substrate (i.e., packaging) to transparent solid state electrochromic devices has been found. It is a feature of the present invention to provide a solid state electrochromic device that is capable of being packaged between two protective substrates to provide a packaged electrochromic device sturdy enough for practical applications.

The protective polymeric coating in the present invention provides adequate protection for electrochromic devices to allow solid state electrochromic devices to be packaged. Because of their sensitive nature, unprotected electrochromic devices are poisoned by laminating materials and are, thus, incapable of being packaged. However, an electrochromic device having a protective coating is protected from any adverse interactions stemming from the laminate material and any impurities that may leech from the laminate materials during the packaging process.

Figure 7:
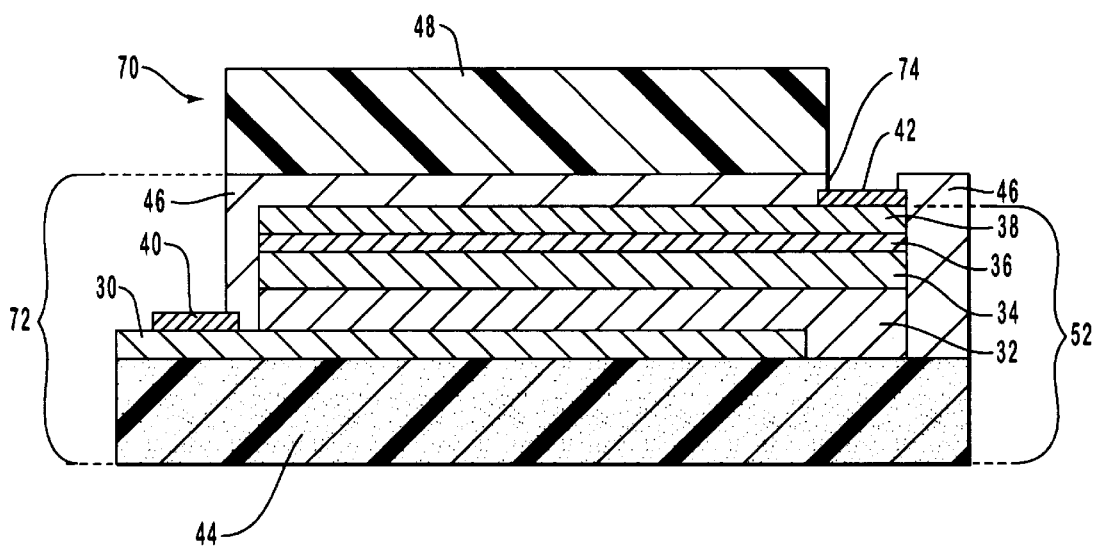
FIG. 7 illustrates a cross-sectional view of a packaged electrochromic device.

FIG. 7 illustrates a packaged electrochromic device 70, comprising an electrochromic device 72 having a second substrate (or laminate) 48, on the electrochromic device. Electrochromic device 72 comprises an electrochromic cell 52 having a protective coating 46 on the electrochromic cell. Electrochromic device 72 has a top portion and a bottom portion. The electrochromic cell preferably comprises a first substrate 44 on the bottom portion of the electrochromic device, an electron conducting layer 30 on the first substrate, a counter electrode layer 32 on the electron conducting layer, an ion conducting layer 34 on the counter electrode layer 32, an electrochromic layer 36 on the ion conducting layer, and a second electron conducting layer 38 on electrochromic layer 36. Protective coating 46 covers the electrochromic cell to form the electrochromic device.

The electrochromic device is packaged by adhering a substrate, or laminating a laminate to the top portion 74 of the electrochromic device 72. Any method of packaging can be used to package an electrochromic device having a protective covering, including but not limited to, vacuum bag lamination, low pressure lamination, such as used in the photovoltaic industry, and the deposition of a hard no-scratch coating.

The problem traditionally encountered with vacuum bag lamination packaging of solid state electrochromic cells is that solid state electrochromic cells are extremely sensitive both physically and chemically. However, in the present invention, the protective polymeric coating 46 on the electrochromic cell 52 protects the electrochromic cell from physical and chemical damage during packaging processes, to allow the electrochromic device to be safely packaged. The protective coating 46 allows a laminate material to be applied to the electrochromic device so that a second substrate can be adhered to the electrochromic device resulting in a packaged solid state electrochromic device 70.

In the vacuum bag lamination process of an electrochromic device, a laminate material 76 is applied to the electrochromic device having a protective coating. A second substrate, such as glass 48, is then aligned with an electrochromic device 72 comprising a protective coating, wherein the protective coating 46 is adjacent to and in contact with the laminate 76 and the laminate acts as an adhesive for the second substrate 48. The electrochromic device/second substrate sandwich 70 is placed into a sealed bag and the air is pumped out of the bag using a vacuum, so that the electrochromic device and the second substrate are in mechanical contact having as few air bubbles as possible therebetween. The bag containing the electrochromic device/second substrate sandwich, is then placed into an autoclave having an elevated temperature, i.e., 100° C., and an elevated pressure, i.e., 10 atmospheres. At high temperatures and high pressures, the laminate material 76 becomes soft and tacky so that the laminate material can function as an adhesive. Upon cooling, the laminate material 76 resolidifies to adhere the second substrate 48 to the top portion 74 of the electrochromic device 72 to form a packaged electrochromic device 70 having a first substrate 44 adhered to indium tin oxide layer 30 and a second substrate 48 adhered to indium tin oxide layer 38.

Unprotected (i.e., uncoated) solid state electrochromic cells have also been too fragile to undergo packaging using photovoltaic lamination. However, when a protective coating is present on the electrochromic cell, the electrochromic device is able to be packaged using low pressure lamination such as used in the photovoltaic industry.

The low pressure lamination of electrochromic devices comprises: 1) aligning a second substrate 48 with an electrochromic device 72 having a protective coating 48 thereon;

2) the electrochromic device/second substrate is subjected to a vacuum to remove air trapped between the second substrate 48 and the electrochromic device 72; and 3) pressure is applied to the second substrate 48 while the electrochromic device/second substrate sandwich is exposed to heat, to enhance the contact between substrate 48 and electrochromic device 50. Upon heating, the laminate material 76 becomes soft and tacky and causes the second substrate to adhere to the electrochromic device. The electrochromic device/second substrate sandwich 70 is then cooled to solidify the laminate material 76, which acts as a transparent adhering material between substrate 48 and electrochromic device 72.

Likewise, until the present invention, solid state devices have not been able to withstand packaging with the deposition of a hard no-scratch coating. The hard no-scratch coating is preferably a polysiloxane that adheres extremely well to the protective polymeric coating 48. After the polysiloxane material is deposited on to the surface of the electrochromic device using conventional deposition techniques, the deposited polysiloxane is subjected to a curing process at high temperatures, i.e., between about 100° C. and 150° C.

It should be noted that the protective coatings disclosed herein can also be used to protect other types of devices and coatings and are especially useful to those devices that are sensitive to mechanical and environmental exposure. The polymeric coating materials can further be used with any device where sealing, protection, and encapsulation of devices, structures and coatings is needed to prevent thermally and environmentally induced degradation. The coatings are applied to other devices in the same manner as applied to electrochromic devices.

EXAMPLE 1

Figure 3:
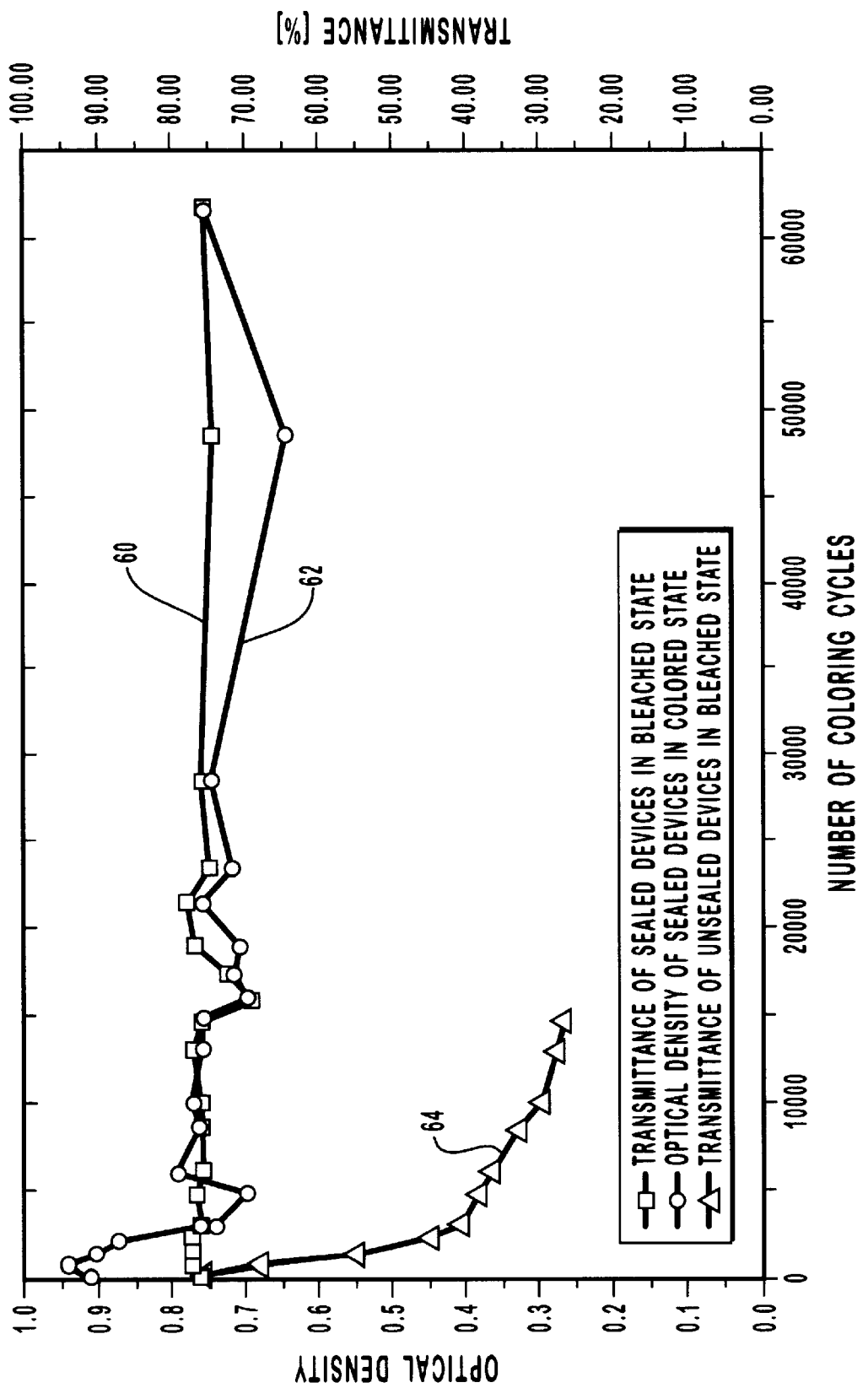
FIG. 3 is a graph illustrating differences in the long term performance between a prior art electrochromic device and an electrochromic device protected by a polymeric sealing layer produced according to the present invention.

As illustrated in FIG. 3, once the electrochromic device is coated with the polymeric protective coating, the long-term performance of the electrochromic device is improved. FIG. 3 provides a graph illustrating the percent transmittance and optical density of a polymer coated electrochromic device over numerous coloring cycles. The transmittance of a polymeric coated electrochromic device in a bleached state followed over 62,000 coloring cycle is illustrated by plot 60. The optical density of a polymeric coated electrochromic device in a colored state over a coloring cycle from 0 to 62,000 is illustrated by plot 62. The 62,000 switching cycles between the colored and bleached states of the electrochromic device were accumulated over an 8 month continuous period. Plot 60 illustrating the transmittance for the bleached state of the electrochromic device is approximately horizonal, indicating that no deterioration in the optical quality occurred over the 62,000 cycles. Plot 62 illustrating the optical density of the electrochromic device over the 62,000 switching cycles is slightly curved, indicating a slight loss in performance of the electrochromic device over the 62,000 color switching cycles. This slight loss, however, can be compensated for by increasing the switching time.

In contrast, unprotected electrochromic devices operated over a comparable period of time show a rapid deterioration in transmittance of their bleached state. The reduction in the bleached state transmitted is also associated with a steep loss in the performance of unsealed devices. Residual color which effects the device performance is the probable cause of the steep decay in transmittance of the bleached state. Additionally, uncoated electrochromic devices show a pronounced decay in the optical density in the colored state over a color switching period of about 62,000 cycles. Decay in the optical density is due to the rapid loss of charge capacity of the counter electrode layer which results in a "lighter" dark colored state.

EXAMPLE 2

Figure 4A:
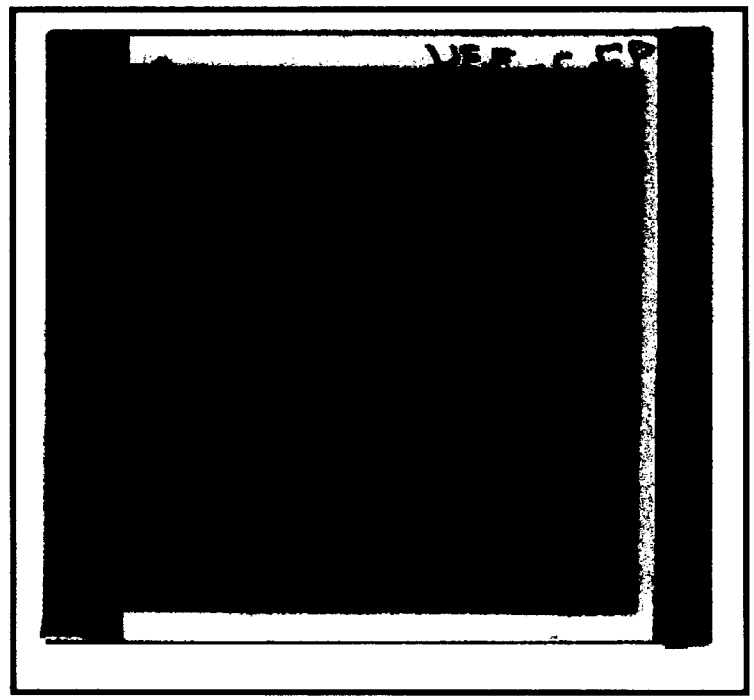
FIG. 4a illustrates the optical deterioration of an unsealed transparent electrochromic device operated at 85° C.
Figure 4B:
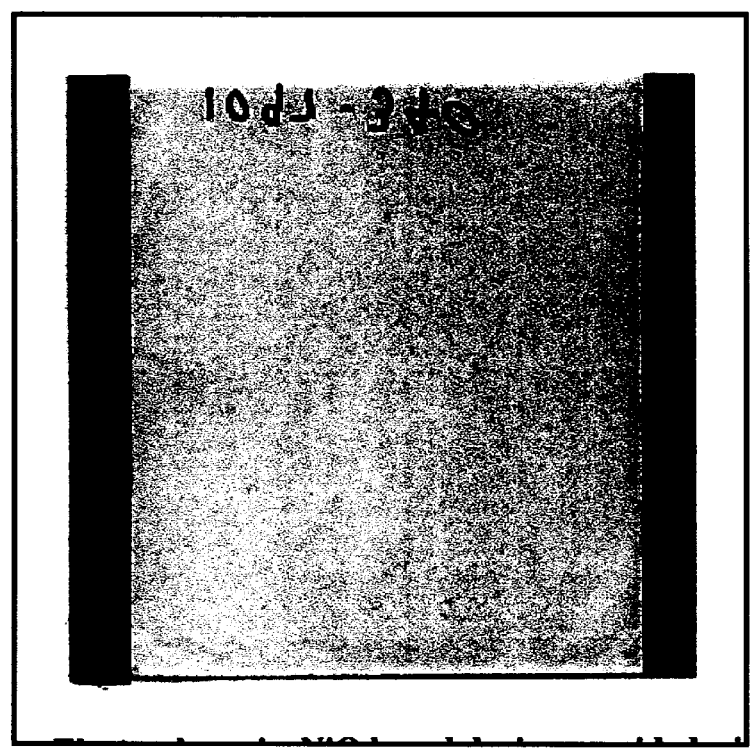
FIG. 4b illustrates the absence of any optical deterioration in a sealed transparent electrochromic device having operated at 85° C. (the device is presented in its bleached state).
Figure 5A:
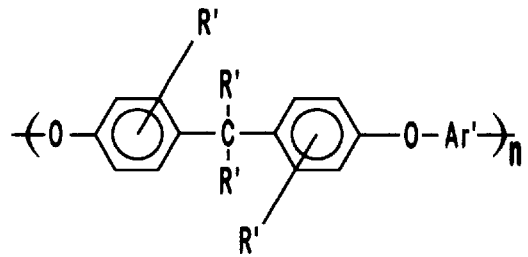
FIGS. 5a–5h contain representations of the generic polymer structures useful as coating materials for electrochromic devices.
Figure 5B:
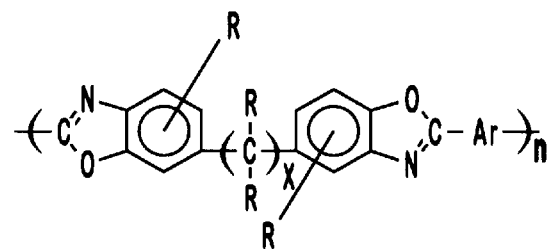
Figure 5C:
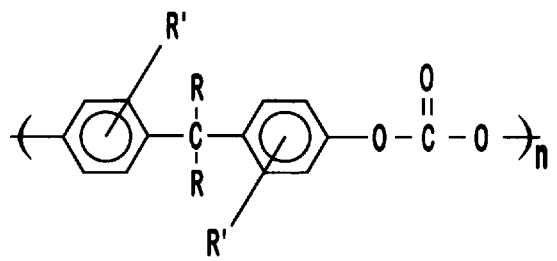
Figure 5D:
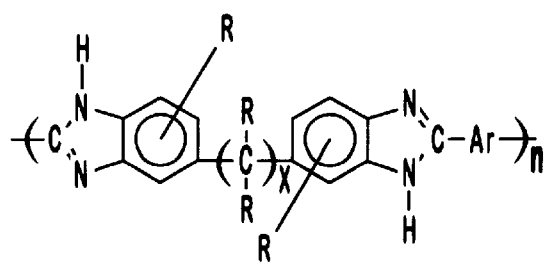
Figure 5E:
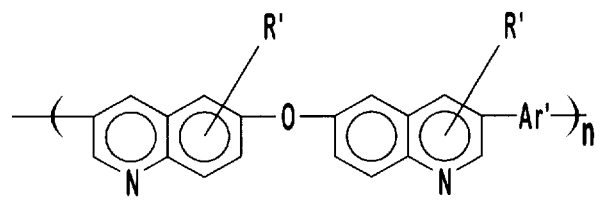
Figure 5F:
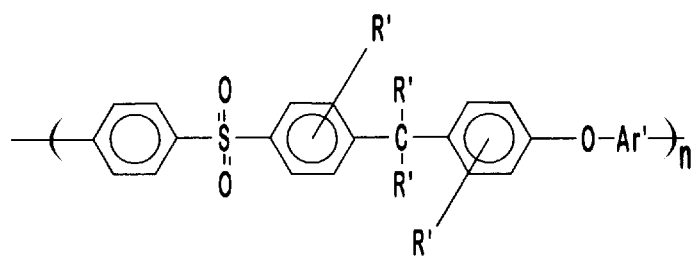
Figure 5G:
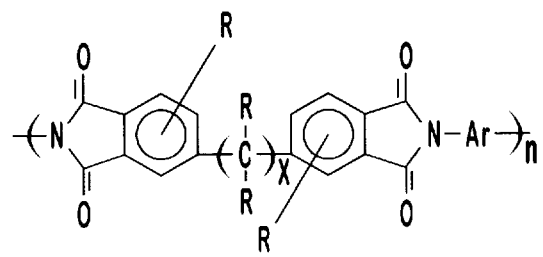
Figure 5H:
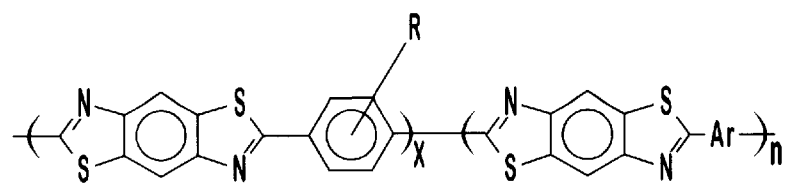
Figure 6A:
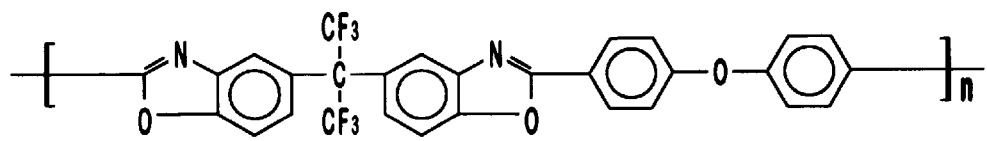
FIGS. 6a–6c contain representations of specific polymer structures useful as coating materials for electrochromic devices.
Figure 6B:
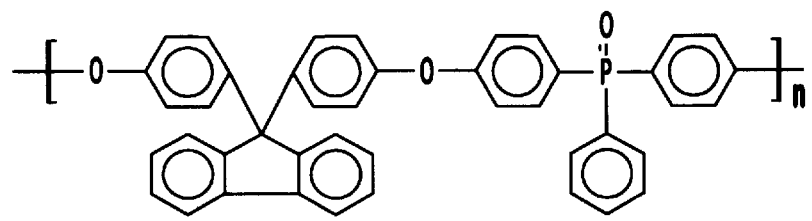
Figure 6C:
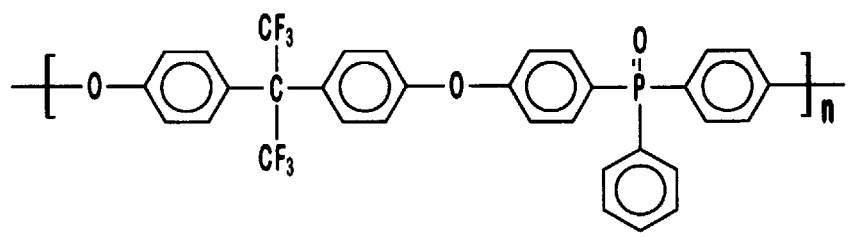

FIGS. 4a and 4b illustrate the optical deterioration of an uncoated transparent electrochromic device (FIG. 4a) operated continuously at 85° C. for about 100 hours, compared with the defect-free appearance of a polymeric coated electrochromic device (FIG. 4b) cycled under the same conditions. FIGS. 4a and 4b clearly illustrate the premature deterioration of electrochromic devices that are not protected by a polymeric coating material. The premature deterioration illustrated in FIG. 4a is caused by exposure to surrounding environmental effects. These environmental effects are avoided by providing an environmental protective coating that inhibits moisture, oxygen, chemicals and other contaminates from contacting the electrochromic cell layers as well as maintaining the proper moisture and chemical balance within the electrochromic cell.

EXAMPLE 3

In a preferred embodiment, a polymeric coated electrochromic device was formed by purifying a necessary quantity of an alpha-[1,4-Biphenylyl]-omega-[4-[[4(4-phenylphenoxy)phenyl]phenylphosphinyl]phenoxy]-poly[oxy-1,4phenylene(phenlphosphinylidene)-1,4-phenyleneoxy-1,4-phenyleneoxy-1,4-phenylene[2,2,2-trifluoro-1-(trifluoromethyl)ethylidene]-1,4-phenylene (hereinafter "6-P polymer") polymer. A 10% by weight polymeric solution of the purified 6P polymer was prepared using an appropriate amount of chlorobenzene. The 10% (by weight) polymeric solution was filtered twice using 5.0 micrometer Teflon membrane and then, for final refinement, a 0.2 micrometer membrane filter to remove any solid particles. The polymeric solution was then out-gassed under a vacuum for 30 minutes to remove any remaining microbubbles or dissolved gasses.

An electrochromic cell with bus bars which had been deposited onto a glass substrate was obtained. The bus bars were covered with an adhesive tape so that the bus bars were not coated with the polymeric coating material. The electrochromic cell was then mounted in the appropriate vacuum chuck of a resist spinner.

The deposition process was started and the polymer solution was dispersed on the top surface of the electrochromic cell. The polymeric solution was then spread over the entire surface of the electrochromic cell by spinning the electrochromic cell for 10 seconds at 500 rpms. The spinning rate was increased to 2000 rpms for 60 seconds to coat the electrochromic cell with the polymer.

After the spin coating step was complete, the coated electrochromic device was dried and annealed for about 20 minutes at about 80° C., during which time the tape which protects the bus bars was removed. When the drying and annealing steps were completed the device was tested for optical quality and electrochromic performance and was transferred to the next manufacturing step.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An electrochromic device comprising:

an electrochromic cell; and a coating on the electrochromic cell, the coating comprising a polymer having a general formula selected from the group consisting of:

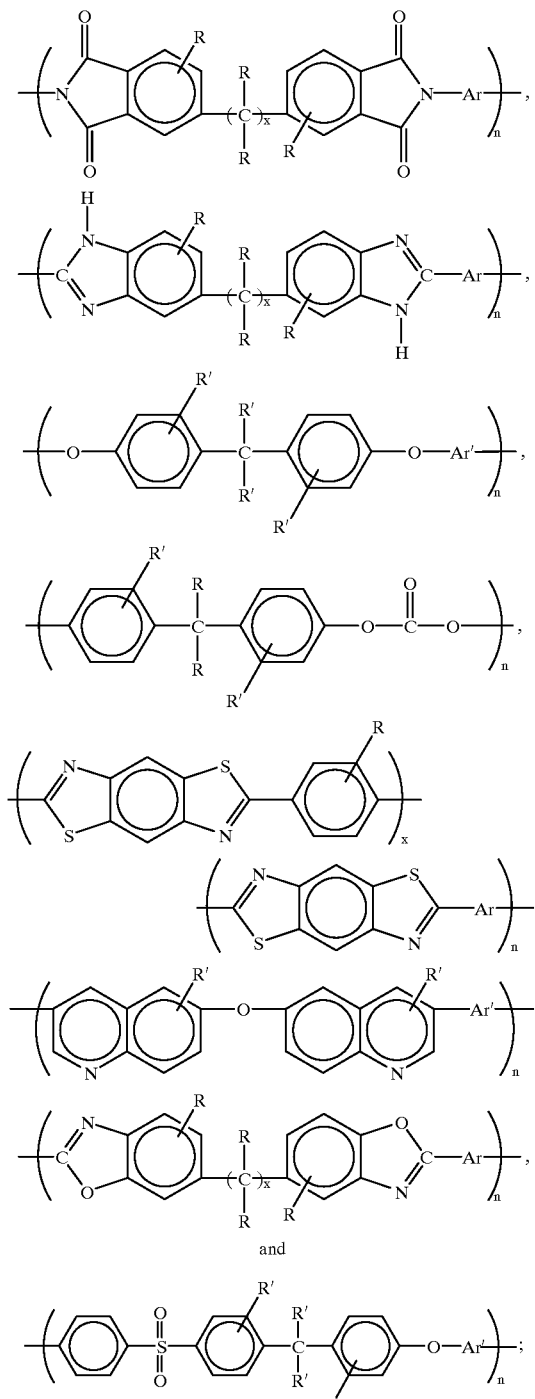

wherein Ar is selected from the group consisting of:

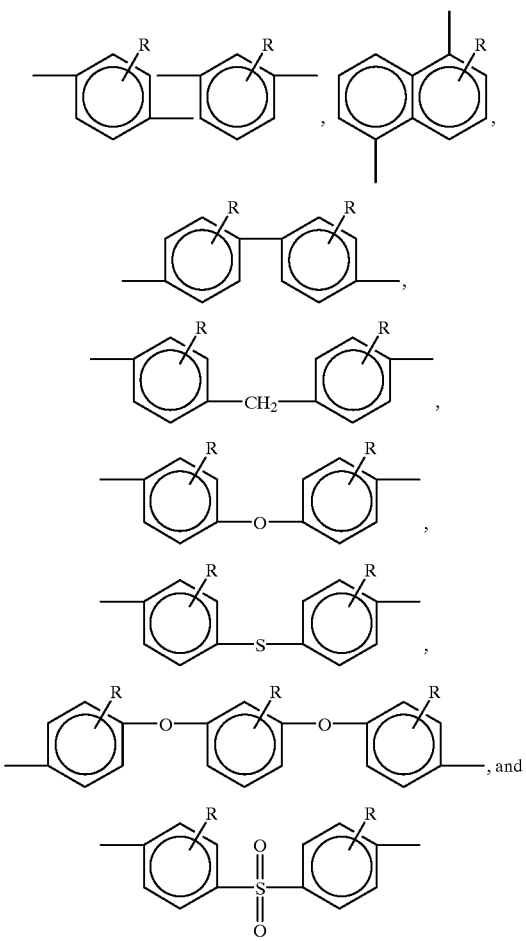

wherein $Ar^1$ is selected from the group consisting of:

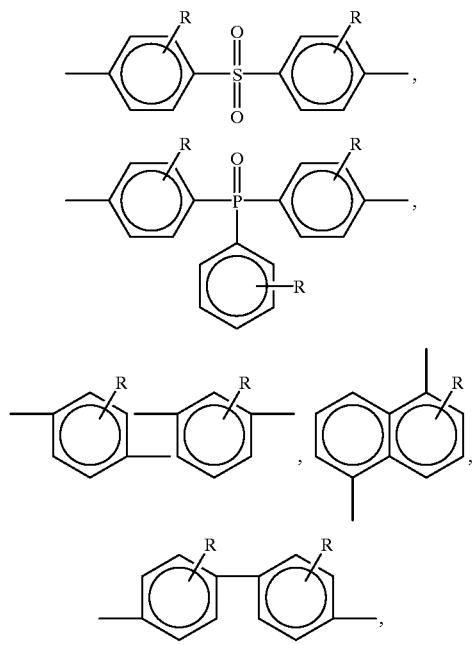

21

-continued

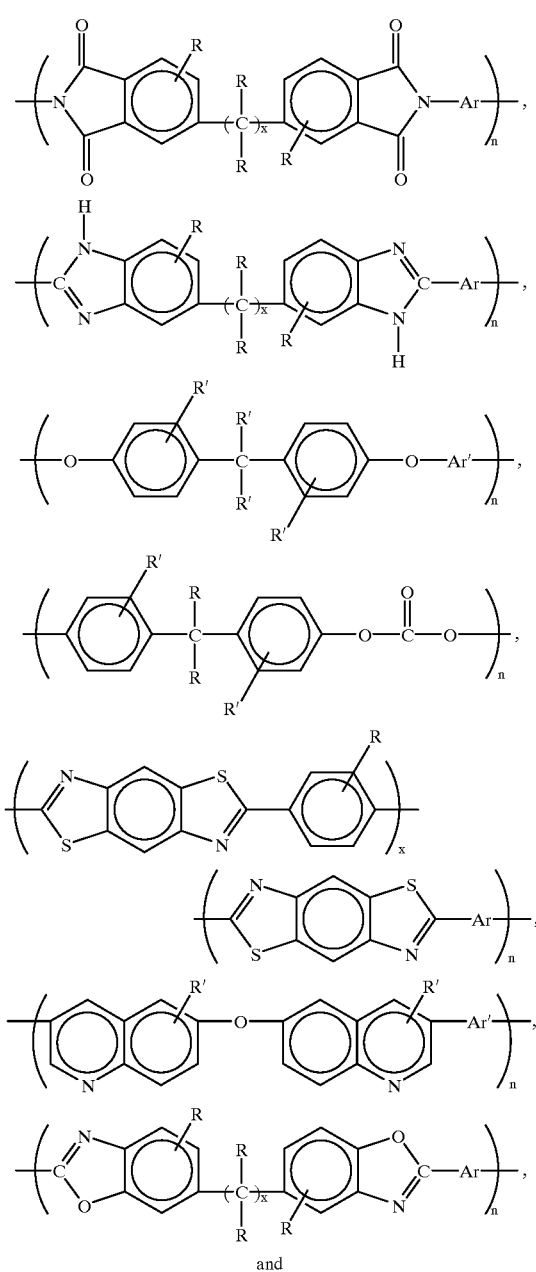

wherein n is between 1 and 10;
wherein X is 0 or 1;
wherein R is selected from the group consisting of H, $CF_3$, $C_nH_{2n+1}$, $OC_nH_{2n+1}$ and mixtures thereof; and
wherein $R^1$ is selected from the group consisting of H, $CF_3$, $C_nH_{2n+1}$, $OC_nH_{2n+1}$, -phenyl, fluorenyl, naphtalenyl and mixtures thereof.

2. An electrochromic device as recited in claim 1, wherein said polymer has the following recurring structural unit [Poly[2,5-benzoxazolediyl[2,2,2-trifluoro-1-(trifluoromethyl)ethylidene]-5,2-benzoxazolediyl-4,4'-phenylether]]n', wherein n' is a integer number.

3. An electrochromic device as recited in claim 1, wherein said polymer has the following recurring structural unit [α-[1,4-Biphenylyl]-ω-[4-[[4-(4-phenylphenoxy)phenyl]phenylphosphinyl]phenoxy]-poly[oxy-1,4-phenylene(phenylphosphinylidene)-1,4-phenyleneoxy-1,4—phenylene-9H-fluoren-9-ylidene-1,4-phenylene]]n', wherein n' is a real number.

4. An electrochromic device as recited in claim 1, wherein said polymer has the following recurring structural unit [α-[1,4-Biphenylyl]-ω-[4-[[4-(4-phenylphenoxy)phenyl]phenylphosphinyl]phenoxy]-poly[oxy-1,4-phenylene(phenylphosphinylidene)-1,4-phenyleneoxy-1,4-phenylene[2,2,2-trifluoro-1-(trifluoromethyl)ethylidene]-1,4-phenylene]]n', wherein n' is a real number.

5. An electrochromic device as recited in claim 1, wherein the electrochromic device is a transparent electrochromic device.

6. An electrochromic device as recited in claim 1, wherein the electrochromic device is a mirror.

7. An electrochromic device as recited in claim 1, wherein the electrochromic device has a low emissivity.

8. An electrochromic device as recited in claim 1, wherein the coating has a thickness in a range from about 0.1 to about 100 micrometers.

9. An electrochromic device as recited in claim 1, wherein the coating has a thickness in a range from about 0.1 to about 20 micrometers.

10. An electrochromic device as recited in claim 1, wherein the electrochromic cell comprises an electrochromic layer, an ion conducting layer and a counter electrode layer.

11. An electrochromic device as recited in claim 1, wherein the coating is thermally stable in a range between about –50° C. and about 150° C.

22

12. An electrochromic device as recited in claim 1, wherein the electrochromic device comprises a top portion and a bottom portion, and wherein the electrochromic device comprises a first substrate on the bottom portion;
wherein the electrochromic device further comprises a second substrate on the top portion of the electrochromic device.

13. An electrochromic device as recited in claim 12, wherein the second substrate is a glass substrate.

14. A process for protecting an electrochromic device from environmental and mechanical damage comprising:
providing an electrochromic cell; and
coating the electrochromic cell with a polymer having the general formula selected from the group consisting of:

and

-continued

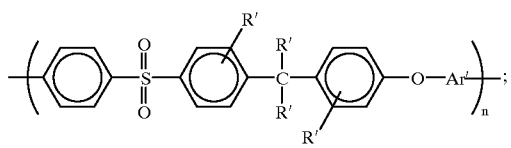

wherein Ar is selected from the group consisting of:

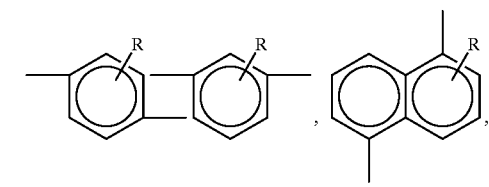

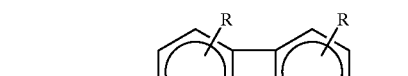,

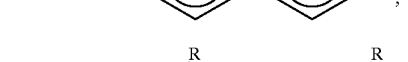,

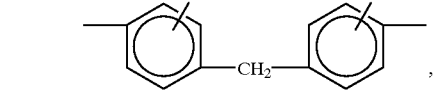,

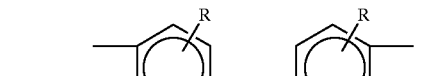,

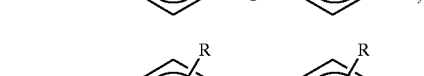,

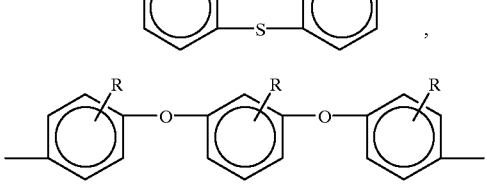, and

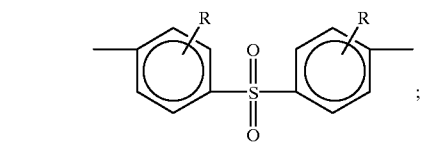;

wherein Ar¹ is selected from the group consisting of:

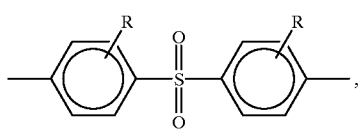,

-continued

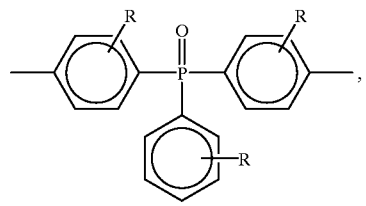,

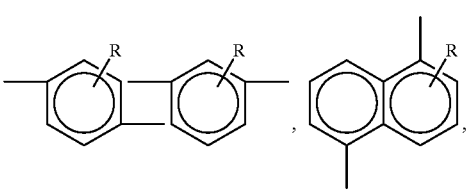,

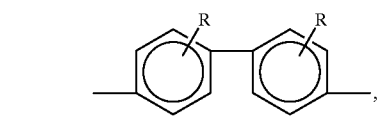,

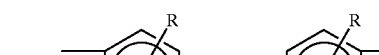,

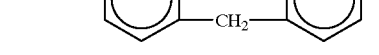,

,

, and

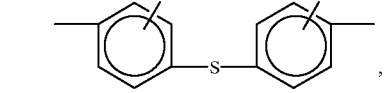;

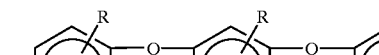

wherein n is between 1 and 10;

wherein X is 0 or 1;

wherein R is selected from the group consisting of H, $CF_3$, $C_nH_{2n+1}$, $OC_nH_{2n+1}$ and mixtures thereof; and wherein R¹ is selected from the group consisting of H, $CF_3$, $C_nH_{2n+1}$, $OC_nH_{2n+1}$, -phenyl, fluorenyl, naphtalenyl and mixtures thereof.

15. A process for protecting an electrochromic device from environmental and mechanical damage as recited in claim 14, further comprising annealing the coating on the electrochromic cell by heating the electrochromic device to a temperature above about 65° C.

* * * * *